(12) United States Patent
Steiner et al.

(10) Patent No.: US 10,066,594 B2
(45) Date of Patent: Sep. 4, 2018

(54) INTERNAL COMBUSTION ENGINE HAVING A SPARK PLUG

(71) Applicant: Ford Global Technologies, LLC, Dearborn, MI (US)

(72) Inventors: Bernd Steiner, Bergisch Gladbach (DE); Oliver Berkemeier, Bergisch Gladbach (DE); Krystian Dylong, Cologne (DE); Jan Mehring, Cologne (DE)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/413,230

(22) Filed: Jan. 23, 2017

(65) Prior Publication Data

US 2017/0218912 A1 Aug. 3, 2017

(30) Foreign Application Priority Data

Jan. 29, 2016 (DE) .................. 10 2016 201 401

(51) Int. Cl.
*F02P 5/145* (2006.01)
*F02P 11/02* (2006.01)
*F02P 9/00* (2006.01)

(52) U.S. Cl.
CPC .............. *F02P 11/02* (2013.01); *F02P 5/145* (2013.01); *F02P 9/002* (2013.01)

(58) Field of Classification Search
CPC . F02P 11/02; F02P 9/002; F02P 5/145; H01T 13/08; F02F 1/242

USPC .............................. 123/169 EC, 169 PA, 164
See application file for complete search history.

(56) References Cited

U.S. PATENT DOCUMENTS

| | | | | | |
|---|---|---|---|---|---|
| 4,503,817 | A | * | 3/1985 | Klomp | F01L 1/26 123/151 |
| 5,000,135 | A | * | 3/1991 | Taguma | F01L 1/08 123/151 |
| 5,463,267 | A | * | 10/1995 | Conway | H01T 13/26 313/125 |
| 6,006,711 | A | * | 12/1999 | Watanabe | F01L 3/24 123/151 |
| 9,391,430 | B2 | * | 7/2016 | Berkemeier | H01T 13/26 |

FOREIGN PATENT DOCUMENTS

| | | |
|---|---|---|
| DE | 10007659 A1 | 9/2001 |
| DE | 102013201188 A1 | 7/2014 |

* cited by examiner

*Primary Examiner* — Hai Huynh
(74) *Attorney, Agent, or Firm* — Julia Voutyras; McCoy Russell LLP

(57) ABSTRACT

Methods and systems are provided for an internal combustion engine having at least one combustion chamber for burning a fuel mixture and a spark plug for performing spark ignition of the fuel mixture in the combustion chamber. The spark plug includes electrodes for generating an ignition spark at a location within the combustion chamber. Furthermore, the internal combustion engine includes an adjustment device for reducing a distance between the location of the ignition spark and an edge of the combustion chamber in the case of an increase in temperature of the internal combustion engine during operation.

18 Claims, 6 Drawing Sheets

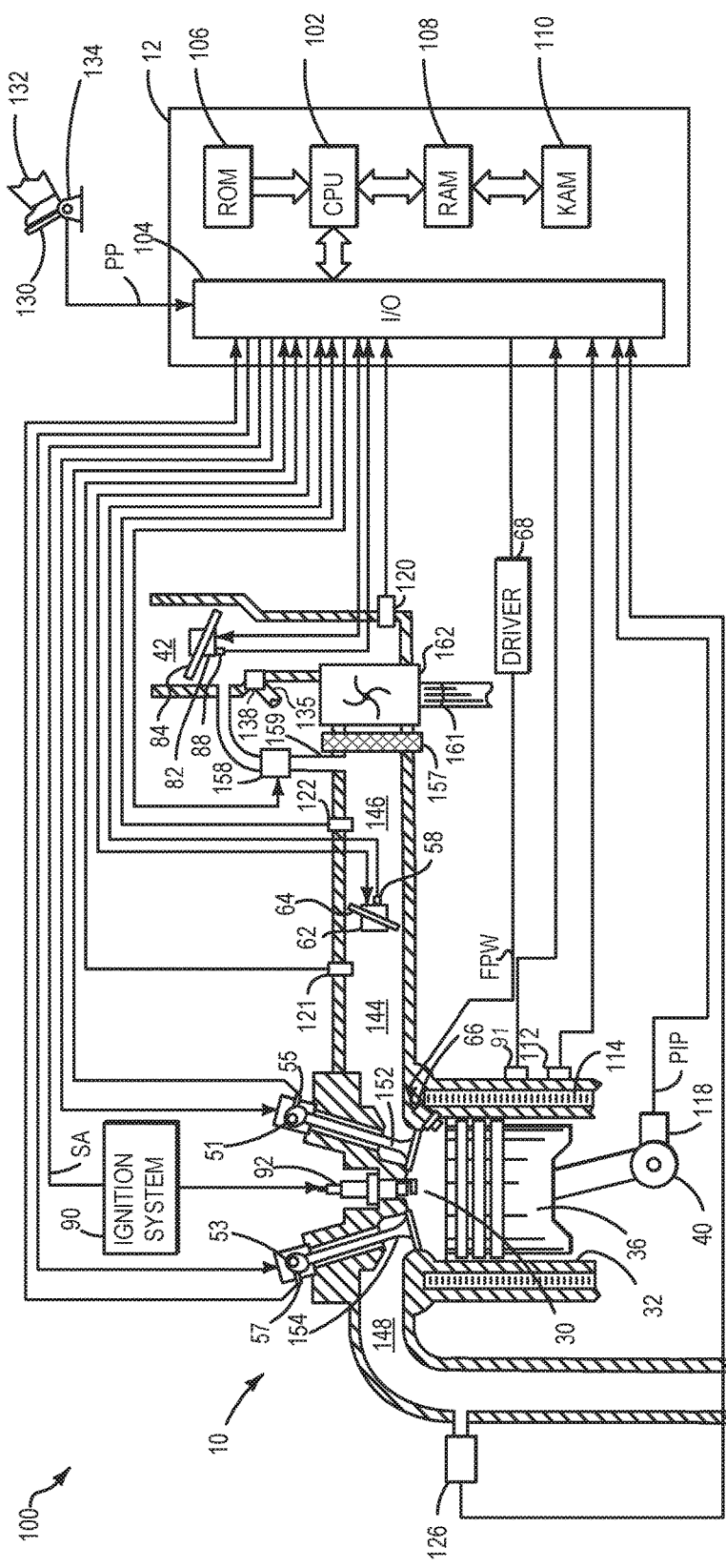
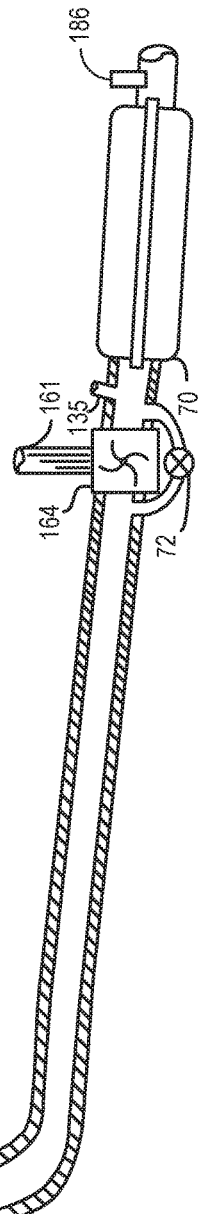
FIG. 1

INTERNAL COMBUSTION ENGINE HAVING A SPARK PLUG

CROSS REFERENCE TO RELATED APPLICATION

The present application claims priority to German Patent Application No. 102016201401.3, filed on Jan. 29, 2016. The entire contents of the above-referenced application are hereby incorporated by reference in its entirety for all purposes.

FIELD

The present description relates generally to methods and systems for operating an internal combustion engine having at least one combustion chamber for burning a fuel mixture and a spark plug for performing spark ignition of the fuel mixture in the combustion chamber.

BACKGROUND/SUMMARY

In internal combustion engines having spark ignition of a fuel/air mixture, such as, for example, in the case of reciprocating piston engines or rotary piston engines, at least one spark plug is usually provided for generating an ignition spark. The spark plug for this purpose is secured in a threaded receptacle of a combustion chamber wall, for example, a cylinder head of a reciprocating piston engine. One end of the spark plug projects with electrodes provided at the end into the combustion chamber. Between the electrodes arranged at a defined distance from one another, an ignition spark is generated at a predefined ignition time by applying a high voltage, the ignition spark igniting the fuel/air mixture.

In order to avoid overheating of the spark plug and, in particular, of the electrodes during operation of the internal combustion engine, the spark plug is typically arranged in such a way that the electrodes of the spark plug and therefore the location of the ignition spark are located relatively close to the combustion chamber wall. In this way, only a small portion of the spark plug projects with the electrodes into the combustion chamber, while the by far larger portion is provided within the combustion chamber wall or on the outside thereof. Sufficient cooling of the spark plug is therefore achieved, in particular, by the conduction away of heat into the cooled combustion chamber wall.

However, the inventors herein have recognized potential issues with such systems. As one example, the small distance between the electrodes, and therefore the ignition spark, and the edge of the combustion chamber has a disadvantageous effect on the ignition of the fuel/air mixture in the case of a cold start or during a warming phase of the internal combustion engine. An ignition process, which is unsuitable for the warming-up phase of the internal combustion engine, can bring about, for example, incomplete combustion of the fuel/air mixture. This may give rise to increased fuel consumption and emission of pollutants in the case of a cold start of the internal combustion engine. In one example, the issues described above may be addressed by an internal combustion engine having at least one combustion chamber for burning a fuel mixture and a spark plug for performing spark ignition of the fuel mixture in the combustion chamber, the spark plug having electrodes for generating an ignition spark at a location within the combustion chamber. The internal combustion engine may include one or more cylinders, each cylinder with a corresponding combustion chamber and, in each case, at least one spark plug for each cylinder. Each spark plug is provided in a spark plug receptacle for the corresponding combustion chamber. The spark plug receptacle may be arranged, for example, in a housing surrounding the corresponding combustion chamber, such as, for example, in a cylinder head, in such a way that the spark plug which is secured by the spark plug receptacle projects with a first end including electrodes into the combustion chamber.

In a further example, an internal combustion engine may include an adjustment device for reducing a distance between the location of the ignition spark and an edge of the combustion chamber in the case of an increase in temperature of the internal combustion engine during operation. In particular, a constant electrode distance between the electrodes during a change in the distance of the ignition spark from the edge of the combustion chamber is provided. The location of the ignition spark is, for example, the center point of the electrode spacing or a location of the ignition spark in the case of an electrode. The distance is preferably reduced with respect to an edge of the combustion chamber directly next to the spark plug. The edge of the combustion chamber is defined, by example, by an inner surface of a housing surrounding the combustion chamber. In this context, displacement of the spark plug in its entirety relative to the edge of the combustion chamber or relative to a housing surrounding the combustion chamber can be provided. According to one embodiment, an adjustment device is provided for each spark plug of the internal combustion engine.

Thus, in the case of heating of the internal combustion engine, the location of the ignition spark, defined by the electrodes of the spark plug, in the combustion chamber is shifted by means of the adjustment device from a position located more within the combustion chamber to a position located closer to the edge. Correspondingly, a change in the ignition spark position can occur from a position located closer to the edge to a position located further inside the combustion chamber, and therefore the distance from the edge of the combustion chamber can be increased in the case of cooling of the internal combustion engine. Therefore, in during a cold start of the internal combustion engine the location of the ignition spark is at a larger distance from the edge of the combustion chamber than in an operationally warm state.

In this way, during a warming-up phase of the internal combustion engine significantly more effective ignition and therefore combustion of the fuel/air mixture takes place in the combustion chamber. This gives rise to lower fuel consumption and emission of pollutants in the case of a cold start. When a predefined operating temperature is reached, the location of the ignition spark is set to be closer to the edge of the combustion chamber. In addition to effective ignition of fuel/air mixture, this ensures, in particular, sufficient cooling of the spark plug even in the case of full load. The service life of the spark plug is optimized.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 1 shows a schematic of an internal combustion engine.

DETAILED DESCRIPTION

Figure 2:
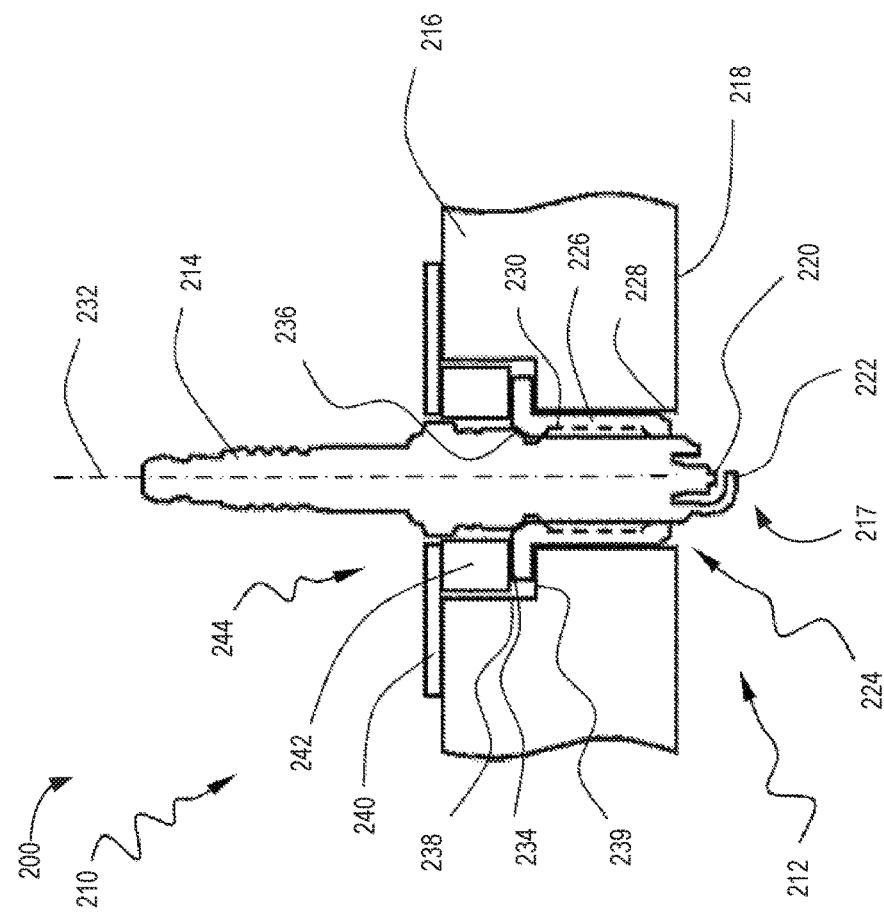
FIG. 2 shows partial view of a first embodiment of an internal combustion engine with a spark plug coupled an adjustment device for regulating a location of an ignition park inside a combustion chamber at a first position.
Figure 3:
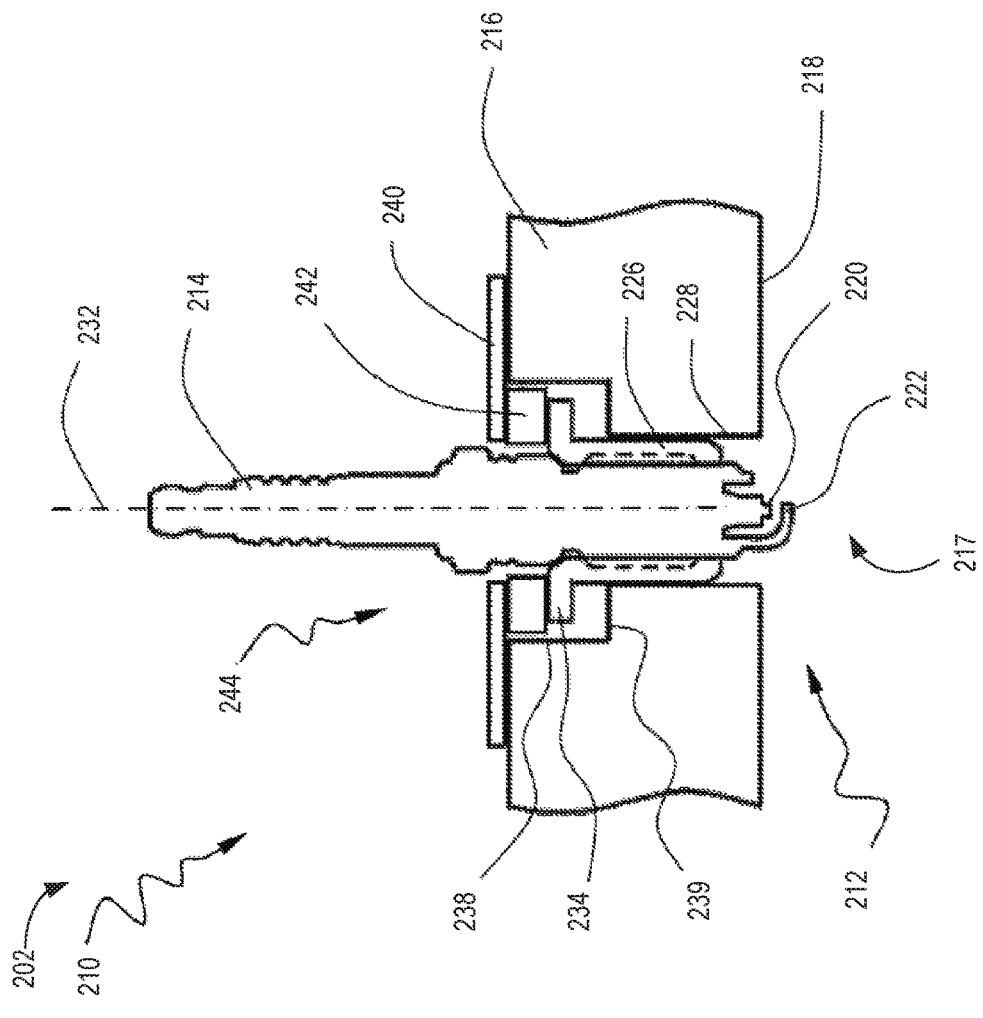
FIG. 3 shows partial view of a first embodiment of an internal combustion engine with a spark plug coupled an adjustment device for regulating a location of an ignition spark inside a combustion chamber at a second position.
Figure 4:
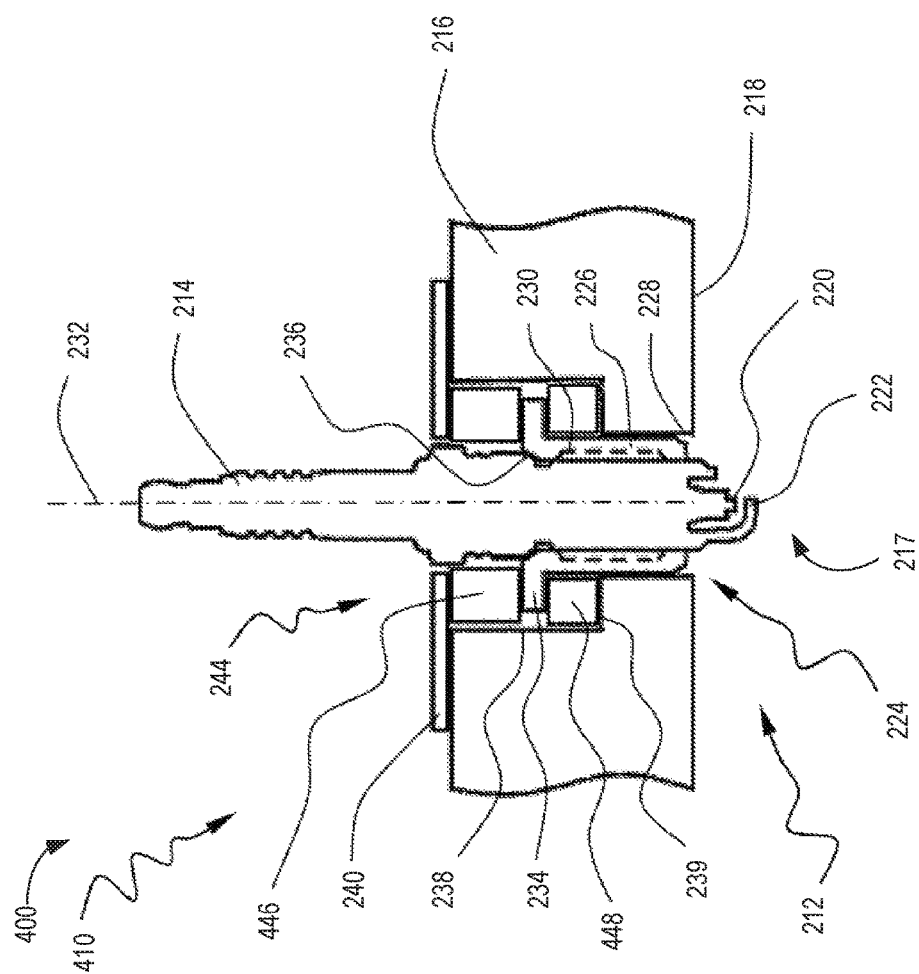
FIG. 4 shows partial view of a second embodiment of an internal combustion engine with a spark plug coupled an adjustment device for regulating a location of an ignition spark inside a combustion chamber at a first position.
Figure 5:
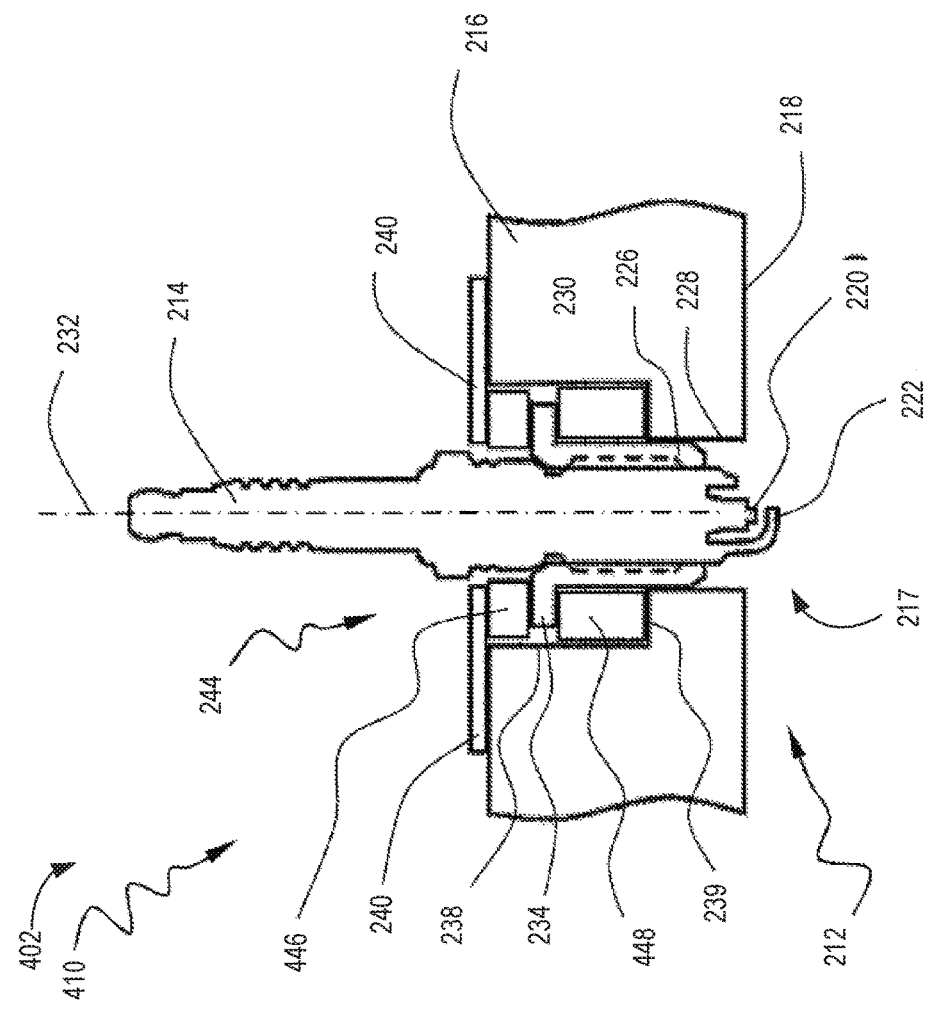
FIG. 5 shows partial view of a second embodiment of an internal combustion engine with a spark plug coupled an adjustment device for regulating a location of an ignition spark inside a combustion chamber at a second position.
Figure 6:
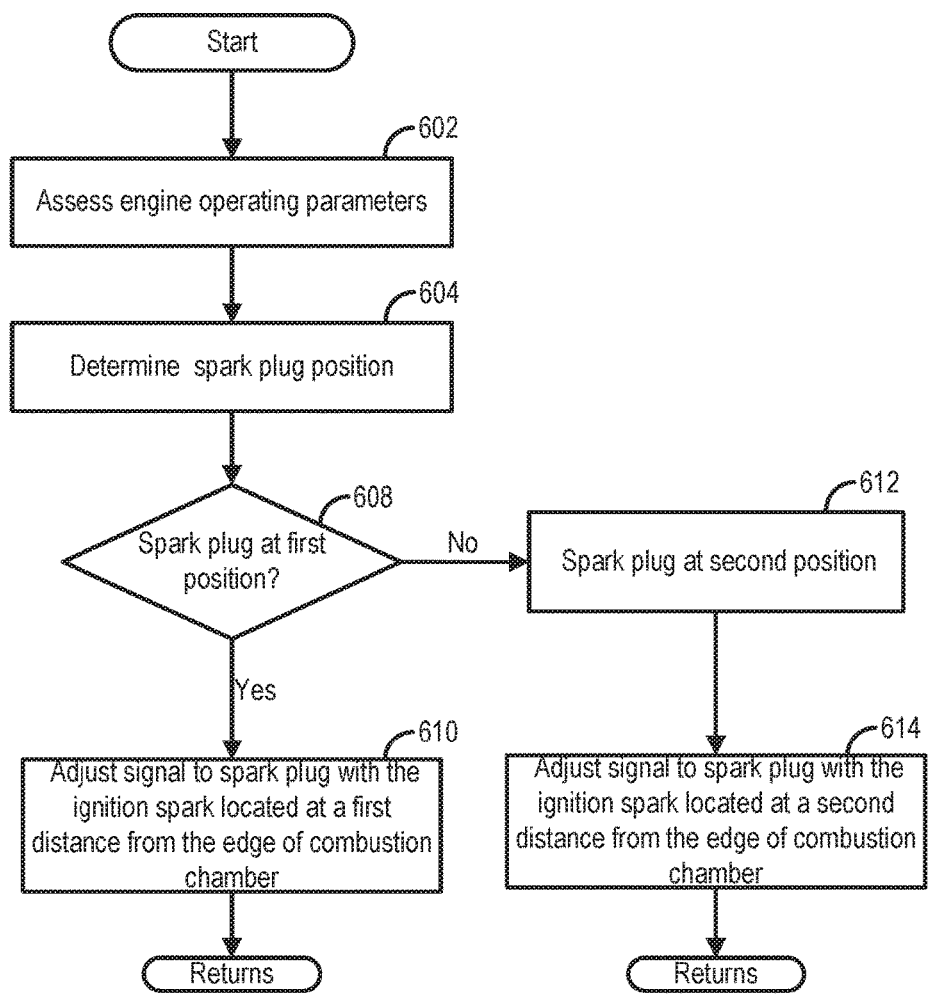
FIG. 6 illustrates a method for operating an internal combustion engine including an adjustment device for positioning a spark plug coupled to a combustion chamber.

The following description relates to systems and methods for regulating location of an ignition spark generated by a spark plug inside a combustion chamber of an internal combustion engine depending on engine operating temperature. FIG. 1 illustrates an internal combustion engine with a spark plug positioned in a combustion chamber. An adjustment device coupled to the spark plug may regulate a location of an ignition spark generated by the spark plug inside the combustion chamber to ignite a fuel mixture during combustion. FIGS. 2 and 3 illustrate partial view of a first embodiment of an internal combustion engine with a spark plug coupled an adjustment device for regulating a location of an ignition park inside a combustion chamber. FIG. 2 illustrates a first position of the spark plug when the engine is operating at low temperatures, for example, at a temperature below a threshold during engine cold start. FIG. 3 illustrates a second position of the spark plug when the engine is operating at temperatures higher than the threshold. The location of the ignition spark generated by the spark plug during cold start conditions is farther from an edge of the combustion chamber, as illustrated in FIG. 2. In contrast, when the engine is operating at higher temperatures than cold start conditions, the location of the ignition spark is closer to the edge of the combustion chamber. FIGS. 4 and 5 illustrate a partial view of a second embodiment of an internal combustion engine with a spark plug coupled to an adjustment device for regulating a location of the ignition park inside the combustion chamber. FIG. 6 illustrates a method for operating an internal combustion engine including an adjustment device for positioning a spark plug coupled to a combustion chamber of the engine.

In one example, the adjustment device may displace the spark plug along a longitudinal axis of the spark plug. With such displacement, a first end of the spark plug including an ignition spark location between electrodes, which projects into a combustion chamber is displaced along the longitudinal axis of the spark plug into the combustion chamber or toward an edge of the combustion chamber. In this context, in the case of heating or upon an increase in temperature of the internal combustion engine, for example, in a housing of the internal combustion engine in the direct surroundings of the adjustment device, the first end of the spark plug with the electrodes is displaced toward the edge of the combustion chamber. The longitudinal axis of the spark plug may be perpendicular relative to a surface of a housing or housing part adjoining the combustion chamber, such as, for example, a cylinder head of the internal combustion engine. According to one embodiment, the adjustment device may carry out thermally activated displacement of the spark plug. For example, the spark plug is displaced through heating the surroundings of the adjustment device or the spark plug, such as, for example, as a result of heat in a cylinder head. The use of thermal energy to displace the spark plug makes possible a very reliable adjustment device for adjusting the location of the ignition spark in the combustion chamber.

In a further example, the adjustment device may include an expansion element. An expansion element changes its shape as a function of its temperature. For example, the expansion element may be a wax expansion element, a bimetal element, or a combination of these elements. In particular, the expansion element may be arranged in such a way that heating of the expansion element displaces the location of the ignition spark within the combustion chamber. The heating of the expansion element may occur, for example, by means of the heating of the internal combustion engine in the surroundings of the adjustment device. For this purpose, the adjustment device may be arranged, for example, in a cylinder head in a spark plug in such a way that heating of the cylinder head also entails heating of the expansion element. Alternatively, a controllable means of heating the expansion element, such as, for example, an electric heating means, may be provided. A cost effective, robust, and reliably functioning adjustment device may be implemented with such an expansion element.

In another example, the expansion element preferably contains a material with a density anomaly. The term material with a density anomaly is used here to denote a material whose density is reduced in a temperature range when the temperature is reduced. The material therefore expands in the case of cooling below a specific temperature. For example, the expansion element contains Wood's metal or some other suitable bismuth alloy. Wood's metal is an alloy of bismuth, lead, cadmium, and tin with a melting point at approximately 60° C. When it solidifies, Wood's metal expands. An expansion element with Wood's metal takes up a larger space in the case of a cold internal combustion engine than in the case of an operationally warm one. In this way, it is possible to implement an adjustment device which is of particularly simple design, functions reliably and presses in a spark plug into the combustion chamber over a relatively large distance between the ignition spark and a combustion chamber wall in the case of a cold internal combustion engine, and conversely permits a relatively small distance of the ignition spark from the combustion chamber wall in the case of a warm internal combustion engine.

In another embodiment, the adjustment device may include a running sleeve that is displaceably arranged in a housing of the internal combustion engine and has the purpose of accommodating the spark plug. For example, the running sleeve may be included in a positively locking fashion in a drilled hole in the housing and may be displaced along the longitudinal axis of the drilled hole. The running sleeve may include on its inner side a thread for accommodating the spark plug. The running sleeve can be provided together with the drilled hole, for example, in a cylinder head of a reciprocating piston engine, instead of a conventional spark plug holder. With such a running sleeve, it may be possible to reliably displace the spark plug along the longitudinal axis of the spark plug when the location of the ignition spark in the internal combustion engine is set. At the same time, the running sleeve ensures secure fixing of the spark plug and effective sealing of the combustion space.

Furthermore, in one example, the expansion element may be arranged between the running sleeve and the housing of the internal combustion engine. For example, the expansion element surrounds a section of the running sleeve circumferentially or is arranged at one or more locations laterally with respect to a circumference of the running sleeve. Additionally or alternatively, one side of the expansion element may rest on a collar of the running sleeve, while an opposite side of the expansion element rests on a surface of the housing or of an attachment element secured to the housing. These measures permit a particularly effective and low maintenance adjustment device for displacing the running bush together with the spark plug.

In one embodiment, a spring element may be provided for prestressing the adjustment device into a predefined position of the location of the ignition spark relative to the edge of the combustion chamber. For example, the spring element prestresses the adjustment device or the spark plug into a position in which the position of the ignition spark is displaced to a maximum degree away from or toward the edge of the combustion chamber by the adjustment device. The spring element contains, for example, a helical spring or a torsion spring, which is embodied in a different way, a leaf spring, diaphragm spring, or a bending spring that is embodied in some other way, or a gas spring or elastomer spring. According to one embodiment, the spring force of the spring element acts counter to an effect of a heating expansion element. In this case, reliable resetting of the adjustment device in the case of a cooling expansion element is achieved with the spring element.

In an example method for operating an internal combustion engine having at least one combustion chamber for burning a fuel mixture, an ignition spark is generated at a location within the combustion chamber between electrodes of a spark plug in order to ignite the fuel mixture. Furthermore, the method comprises a reduction in a distance between the location of the ignition spark and an edge of the combustion chamber in the case of an increase in temperature of the internal combustion engine during operation.

An electrode spacing between the electrodes preferably remains constant during a change in the distance of the ignition spark from the edge of the combustion chamber. Displacement of the spark plug as a whole relative to the edge of the combustion chamber or relative to the housing surrounding the combustion chamber may be provided. In addition, in an embodiment of the method, the location of the ignition spark may be displaced by means of an adjustment device at each spark plug of the internal combustion engine.

In an example, in the event of a cold start the ignition spark is firstly located at a relatively large distance from the edge of the combustion chamber. During the warming-up of the internal combustion engine, particularly effective ignition and combustion of the fuel/air mixture therefore takes place. Reduced consumption of fuel and emission of pollutants are achieved. The heating of the internal combustion engine entails displacement of the location of the ignition spark closer to the edge of the combustion chamber. In the case of an operationally warm internal combustion engine, in particular sufficient cooling of the spark plug is ensured in this way.

Further embodiments of the method according respectively correspond to described embodiments of the internal combustion engine and have corresponding features and advantages.

Referring now to FIG. 1, FIG. 1 depicts an engine system 100 for a vehicle. The vehicle may be an on-road vehicle having drive wheels that contact a road surface. Engine system 100 includes an engine 10 that comprises a plurality of cylinders. FIG. 1 describes one such cylinder or combustion chamber in detail. The various components of engine 10 may be controlled by electronic engine controller 12. Engine 10 includes combustion chamber 30 and cylinder walls 32 with piston 36 positioned therein and connected to crankshaft 40. Combustion chamber 30 is shown communicating with intake manifold 144 and exhaust manifold 148 via respective intake valve 152 and exhaust valve 154. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail. Fuel injector 66 is supplied operating current from driver 68, which responds to controller 12. In addition, intake manifold 144 is shown communicating with optional electronic throttle 62, which adjusts a position of throttle plate 64 to control airflow to engine cylinder 30. This may include controlling airflow of boosted air from intake boost chamber 146. In some embodiments, throttle 62 may be omitted and airflow to the engine may be controlled via a single air intake system throttle (AIS throttle) 82 coupled to air intake passage 42 and located upstream of the boost chamber 146.

In some embodiments, engine 10 is configured to provide exhaust gas recirculation, or EGR. When included, EGR is provided via EGR passage 135 and EGR valve 138 to the engine air intake system at a position downstream of air intake system (AIS) throttle 82 from a location in the exhaust system downstream of turbine 164. EGR may be drawn from the exhaust system to the intake air system when there is a pressure differential to drive the flow. A pressure differential can be created by partially closing AIS throttle 82. Throttle plate 84 controls pressure at the inlet to compressor 162. The AIS may be electrically controlled and its position may be adjusted based on optional position sensor 88.

Compressor 162 draws air from air intake passage 42 to supply boost chamber 146. In some examples, air intake passage 42 may include an air box (not shown) with a filter. Exhaust gases spin turbine 164 that is coupled to compressor 162 via shaft 161. A vacuum operated wastegate actuator 72 allows exhaust gases to bypass turbine 164 so that boost pressure can be controlled under varying operating conditions. In alternate embodiments, the wastegate actuator may be pressure or electrically actuated. Wastegate 72 may be closed (or an opening of the wastegate may be decreased) in response to increased boost demand, such as during an operator pedal tip-in. By closing the wastegate, exhaust pressures upstream of the turbine can be increased, raising turbine speed and peak power output. This allows boost pressure to be raised. Additionally, the wastegate can be moved toward the closed position to maintain desired boost pressure when the compressor recirculation valve is partially open. In another example, wastegate 72 may be opened (or an opening of the wastegate may be increased) in response to decreased boost demand, such as during an operator pedal tip-out. By opening the wastegate, exhaust pressures can be reduced, reducing turbine speed and turbine power. This allows boost pressure to be lowered.

Compressor recirculation valve 158 (CRV) may be provided in a compressor recirculation path 159 around compressor 162 so that air may move from the compressor outlet to the compressor inlet so as to reduce a pressure that may develop across compressor 162. A charge air cooler 157 may be positioned in passage 146, downstream of compressor 162, for cooling the boosted aircharge delivered to the engine intake. In the depicted example, compressor recirculation path 159 is configured to recirculate cooled compressed air from downstream of charge air cooler 157 to the compressor inlet. In alternate examples, compressor recirculation path 159 may be configured to recirculate compressed air from downstream of the compressor and upstream of charge air cooler 157 to the compressor inlet. CRV 158 may be opened and closed via an electric signal from controller 12. CRV 158 may be configured as a three-state valve having a default semi-open position from which it can be moved to a fully open position or a fully closed position.

Distributorless ignition system 90 provides an ignition spark to combustion chamber 30 via spark plug 92 in response to controller 12. The ignition system 90 may include an induction coil ignition system, in which an ignition coil transformer is connected to each spark plug of the engine.

A first exhaust oxygen sensor 126 is shown coupled to exhaust manifold 148 upstream of catalytic converter 70. A second exhaust oxygen sensor 186 is shown coupled in the exhaust downstream of the converter 70. The first exhaust oxygen sensor 126 and the second exhaust oxygen sensor 186 may be any one of a Universal Exhaust Gas Oxygen (UEGO) sensor, a heated exhaust oxygen sensor (HEGO), or two-state exhaust oxygen sensor (EGO). The UEGO may be a linear sensor wherein the output is a linear pumping current proportional to an air-fuel ratio.

Converter 70 includes an exhaust catalyst. For example, the converter 70 can include multiple catalyst bricks. In another example, multiple emission control devices, each with multiple bricks, can be used. Converter 70 can be a three-way type catalyst in one example. While the depicted example shows first exhaust oxygen sensor 126 upstream of turbine 164, it will be appreciated that in alternate embodiments, the first exhaust oxygen sensor 126 may be positioned in the exhaust manifold downstream of turbine 164 and upstream of convertor 70. Further, the first exhaust oxygen sensor 126 may be referred to herein as the pre-catalyst oxygen sensor and the second exhaust oxygen sensor 186 may be referred to herein as the post-catalyst oxygen sensor. The first and second oxygen sensors may give an indication of exhaust air-fuel ratio. For example, the second exhaust oxygen sensor 186 may be used for catalyst monitoring while the first exhaust oxygen sensor 126 may be used for engine control. Further, both the first exhaust oxygen sensor 126 and the second exhaust oxygen sensor 186 may operate at a switching frequency or response time in which the sensor switches between lean and rich air-fuel control (e.g., switches from lean to rich or from rich to lean). In one example, an exhaust oxygen sensor degradation rate may be based on the switching frequency of the sensor, the degradation rate increasing for decreasing switching frequency. In another example, the exhaust oxygen sensor degradation rate may be based on a response time of the exhaust oxygen sensor, the degradation rate increasing for decreasing response time. For example, if the sensor is a linear sensor (such as a UEGO), the sensor degradation rate may be based on the response time of the sensor. Alternatively, if the sensor is not a linear sensor (such as a HEGO), the sensor degradation rate may be based on the switching frequency of the sensor. For the purposes of describing the methods below, switching frequency and response time may be used interchangeably in inferring spark plug fouling. However, in some embodiments, the analysis of switching frequency vs. response time may be based on whether the exhaust oxygen sensor is nonlinear or linear, respectively.

Engine 10 may further include one (as depicted) or more knock sensors 91 distributed along a body of the engine (e.g., along an engine block). When included, the plurality of knock sensors may be distributed symmetrically or asymmetrically along the engine block. Knock sensor 91 may be an accelerometer (e.g., vibration sensor), an ionization sensor, or an in-cylinder transducer. In one example, the controller 12 may be configured to detect engine block vibrations generated due to abnormal combustion events, such as knocking and pre-ignition with the knock sensor 91.

Further, the controller 12 may be configured to perform adaptive knock control. Specifically, the controller 12 may apply a certain amount of spark angle retard to the ignition timing in response to sensing knock with the knock sensor 91. The amount of spark retard at the current speed-load operating point may be determined based on values stored in a speed/load characteristic map. This may be referred to as the adaptive knock term. When the engine is operating in the same speed-load region again, the adaptive knock term at the speed-load operation point may be updated. In this way, the adaptive knock term may be updated during engine operation. The adaptive knock term may be monitored over a predetermined duration (e.g., time or number of engine cycles) of engine operation or predetermined distance of vehicle travel. If knocking rates increase with an increasing change in the adaptive knock term, spark plug fouling may be indicated. As such, the controller may monitor knock via the knock sensor 91, as well as changes in the adaptive knock term in order to infer a level of spark plug fouling, as described further below with reference to FIGS. 2-3.

Controller 12 is shown in FIG. 1 as a microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator pedal position (PP) adjusted by a foot 132 of a vehicle operator; a knock sensor for determining ignition of end gases; a measurement of engine manifold pressure (MAP) from pressure sensor 121 coupled to intake manifold 144; a measurement of boost pressure from pressure sensor 122 coupled to boost chamber 146; an engine position sensor from a Hall effect sensor 118 (or other variable reluctance sensor) sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof.

During operation, each cylinder within engine 10 typically undergoes a four-stroke cycle: the cycle includes the intake stroke, compression stroke, expansion stroke, and exhaust stroke. During the intake stroke, generally, the exhaust valve 154 closes and intake valve 152 opens. Air is introduced into combustion chamber 30 via intake manifold 144, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 152 and exhaust valve 154 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 154 opens to release the combusted air-fuel mixture to exhaust manifold 148 and the piston returns to TDC. Note that the above is described merely as an example, and that intake and exhaust valve opening and/or closing timings may vary, such as to provide positive or negative valve overlap, late intake valve closing, or various other examples.

In one embodiment, an ignition coil circuit may include spark plug fouling detection components. In this embodiment, spark plug fouling may be determined based on a switching time taken for a control current of a control wire of an ignition coil to drop below a predetermined value after application of a dwell command. However, this method of detecting spark plug fouling may be complex and expensive to implement. Thus, not all engine systems may include an ignition coil circuit having spark plug fouling detecting components. Instead, the controller may monitor a plurality of engine operating parameters correlated with spark plug health and infer spark plug fouling due to fuel additive accumulation based on changes of one or more of the plurality of engine operating parameters.

FIGS. 2-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In FIG. 2, a partial region of a first embodiment of an internal combustion engine 210 is illustrated schematically including a combustion chamber 212 and a spark plug 214. The spark plug 214 is at a first position 200. In one example, the internal combustion engine 210 may be same as the engine 10 of FIG. 1. The combustion chamber 212 may be the combustion chamber 30 of FIG. 1 and the spark plug 214 may be the spark plug 92 of FIG. 1. The combustion chamber 212 is in a cylinder (not illustrated) and a reciprocating piston is arranged in the cylinder of the internal combustion engine 210. In particular, the internal combustion engine 210 may have a plurality of combustion chambers, which are embodied in a corresponding way. The internal combustion engine 210 may be a reciprocating piston engine. In alternative embodiments, the combustion chambers that do not include a reciprocating piston, such as, for example, a rotary piston engine may be included in the internal combustion engine.

The combustion chamber 212 may be surrounded not only by the reciprocating piston but also by a housing 216 of the internal combustion engine. In FIG. 2, just one region of the combustion chamber 212 and of the housing 216 is illustrated along with the spark plug 214. The housing 216 illustrated in FIG. 2 constitutes, for example, a cylinder head and constitutes with its surface located with respect to the combustion chamber 212, an edge 218 of the combustion chamber 212. A first end 217 of the spark plug 214 projects through the housing 216 into the combustion chamber 212. At the first end 217 of the spark plug 214, electrodes 220, 222 are arranged, between which an ignition spark for igniting a fuel/air mixture located in the combustion chamber 212 is generated at a predefined time by means of a high voltage.

The position of the electrodes 220, 222 in the combustion chamber 212 is defined by the location of the spark plug 214 relative to the edge 218 of the combustion chamber 212 and therefore to the housing 216. For this purpose, the spark plug 214 may be secured in a spark plug receptacle 224. In contrast to the conventional spark plug receptacle with a threaded drilled hole, which is provided in the cylinder head for screwing the spark plug, the spark plug receptacle 224 may include a running sleeve 226. The running sleeve 226 is arranged in a positively locking and displaceable fashion in a recess in the housing 216, which is formed as a drilled hole 228. In alternative embodiments, instead of a drilled hole, a recess, which is shaped in some other way and a running sleeve, which is embodied correspondingly, may be provided. On an inner side of the running sleeve 226, a thread 230 for receiving and securing the spark plug 214 is provided in the running sleeve 226. The spark plug 214 may be arranged to be displaceable together with the running sleeve 226 in the drilled hole 228 along the longitudinal axis 232 of the spark plug 214. The drilled hole 228 and the running sleeve 226 may be such that that the longitudinal axis 232 of the spark plug 214 is arranged essentially perpendicularly with respect to the edge 218 of the combustion chamber 212 in the case of the spark plug 214.

The running sleeve 226 has, at its end facing away from the combustion chamber 212, a radially outwardly extending collar 234 and a support face 236 for the spark plug 214. The spark plug 214 may be screwed into the running sleeve 226 until it bears against the support face 236, and may thereby be secured in a precisely predefined position relative to the running sleeve 226. The collar 234 that is arranged along a circumference of the running sleeve 226 projects into a projection 238 of the drilled hole 228, and in the case of a cold internal combustion engine 210 rests with its side directed toward the combustion chamber 212 on a support face 239 of the housing 216 in the projection 238. The spark plug 214 may therefore be pushed into the combustion chamber together with the running sleeve 226 only as far as the first position 200 illustrated in FIG. 2. Alternatively, instead of the collar 234, one or more projections of different shapes may also be provided on the running sleeve.

An expansion element 242 may be included between the side of the collar 234 facing away from the combustion chamber 212 and an attachment element 240 arranged on the outside of the housing 216. In one example, the expansion element 242 may be present circumferentially around the spark plug 214 and may rest with one side on the collar 234 and with an opposite side on the attachment element 240. Alternatively, one or more differently shaped expansion elements may also be used. In one example, the expansion element may include Wood's metal. Wood's metal is an alloy of bismuth, lead, cadmium, and tin with a melting point of approximately 60° C. Wood's metal expands when it solidifies. Wood's metal is therefore a material with a density anomaly. Density of Wood's metal is reduced in a temperature range when the temperature decreases. The expansion element expands in the case of cooling and retracts in the case of heating. In alternative embodiments, instead of Wood's metal a different bismuth alloy, for example Rose's metal, or a different suitable material with a density anomaly may be used.

The running sleeve 226, the expansion element 242, and the attachment element 240 are components of an adjustment device 244 for setting the location of the ignition spark of the spark plug 214 in the combustion chamber 212. When the internal combustion engine 210 heats up during operation, the location of the ignition spark closer to the edge 218 of the combustion chamber 212 is set, and in the case of cooling the location is conversely set further within the combustion chamber 212. For this purpose, corresponding displacement of the spark plug 214 with respect to the housing 216 is carried out by the adjustment device 244. In particular, conventional spark plugs may be used in the adjustment device 244.

A method of operating the internal combustion engine including the adjustment device 244 will be described below with reference to FIG. 6. Before and during a cold start of the internal combustion engine the adjustment device 244 is located with the running sleeve 226 and the spark plug 214 in the first position 200 illustrated in FIG. 2. The Wood's metal of the expansion element 242 is present in its solid form, as a result of which the expansion element 242 presses the collar 234 of the running sleeve 226 against a support face 239 of the housing 216 in the projection 238, and in doing so extends between the collar 234 and the attachment element 240. In the case of a cold start and during a warming-up phase, the expansion element 242 continues to hold the collar 234 and therefore the running sleeve 226 with the spark plug 214 in this position counter to the pressure of a fuel/air mixture or of combustion gases in the combustion chamber 212.

FIG. 3 shows a schematic view of the part of the internal combustion engine 210 of FIG. 2 during operation at a predefined operating temperature. In the warming-up phase, the temperature of the housing 216, of the running sleeve 226 and of the spark plug 214 rises continuously. The expansion element 242 takes on the temperature of its surroundings, in particular of the running sleeve 226 and of the housing 216. If the temperature exceeds approximately 60° C., the Wood's metal in the expansion element 242 begins to melt and reduces its volume owing to the density anomaly. The expansion element 242 retracts. In the volume that becomes free, the running sleeve 226 moves back with the spark plug 214 because of the pressure in the combustion chamber 212. The running sleeve 226 and the spark plug 214 are therefore pushed away from the combustion chamber along the drilled hole 228. In one example, in order to assist this process a spring element (not shown) may be provided between the side of the collar 234 facing the combustion chamber 212 and the face 239 of the projection 238.

FIG. 3 illustrates a second position 202 of the spark plug 214 after a warming-up phase. The collar 234 of the running sleeve 226 rests with one side on the expansion element 242 with a relatively small volume. The running sleeve 226 is held in this position by the pressure in the combustion chamber 212. It is apparent that as a result of the displacement of the spark plug 214, the electrodes 220, 222 rest significantly closer to the edge 218 of the combustion chamber 212 in the case of the drilled hole 228 than in the case of the cold start and during warming-up according to FIG. 2. During the warming-up phase, the location of the ignition spark is situated further into the combustion chamber 212 than in the case of the operationally warm internal combustion engine 210. The adjustment device 244 reduces the distance between the ignition spark and the edge 218 of the combustion chamber in the case of a rise in temperature of the internal combustion engine 210. After the internal combustion engine 210 has been switched off, it cools back down to the ambient temperature. In this context, the Wood's metal solidifies and the expansion element 242 expands. The running sleeve 226 with the spark plug 214 is displaced in the direction of the combustion chamber 212 until the one side of the collar 234 rests on the face 239 of the projection 238 of the housing 216, as illustrated in FIG. 2. The location of the ignition spark therefore is again at a relatively large distance from the edge 218 of the combustion chamber 212 in the case of the drilled hole 228.

FIG. 4 shows a part view of a second embodiment of an internal combustion engine 410 including the spark plug 214. The spark plug 214 is at a first position 400. The internal combustion engine 410 corresponds largely to the internal combustion engine 210 of FIG. 2. Structurally or functionally identical or similar components are therefore designated by corresponding reference signs. For a description of these components, reference is made both to what is stated below and, in particular, also to the remarks concerning FIGS. 2 and 3.

In contrast to the first embodiment of the internal combustion engine 210, the second embodiment of the internal combustion engine 410 includes a spring element 446, instead of the expansion element, between the side of the collar 234 facing away from the combustion chamber 212 and the attachment element 240 arranged on the outside of the housing 216. The spring element 446 prestresses the running sleeve in the direction of the combustion chamber 212. In on example, the spring element 446 may include a helical spring. In other examples, the spring element 446 may include a torsion spring, a bending spring, such as for example, a leaf spring or a diaphragm spring, or a gas spring or an elastomer spring. Furthermore, an expansion element 448 is provided between the side of the collar 234 facing the combustion chamber 212 and a support face of the projection 238 of the housing. This expansion element contains, in contrast to the first exemplary embodiment, no material with a density anomaly and expands in the case of heating. For this purpose, the expansion element 448 may include, for example, wax or some other suitable material. Alternatively or additionally, the expansion element 448 may include a correspondingly embodied bimetal element.

Before or during a cold start, the adjustment device 244 and the spark plug 214 are located in the first position 400 illustrated in FIG. 4. The spring element 446 prestresses the running sleeve 226 against the expansion element 448, which takes up less volume in the cold state than in the warm one. The spark plug 214 therefore projects with the electrodes 220, 222 relatively far into the combustion chamber 212 and is prestressed in this position counter to the pressure in the combustion chamber 212 by the spring element 446. Heating of the internal combustion engine 410 also causes the temperature of the expansion element 448 to rise. The expansion element 448 expands and pushes the running sleeve 226 away from the combustion chamber 212 counter to the spring force of the spring element 446.

FIG. 5 shows the part view of the internal combustion engine of FIG. 4 after a predefined operating temperature has been reached. The spark plug 214 along with the adjustment device is in a second position 402, as shown in FIG. 5. At the second position 402, the expansion element 448 has heated up and expanded to a previously defined degree. As a result of the displacement of the running sleeve 226 with the spark plug 214, the location of the ignition spark between the electrodes 220, 222 is now closer to the edge 218 of the combustion chamber 212 in the case of the drilled hole 228. As in the first embodiment, effective cooling of the spark plug 214 is ensured, whereas in the case of a cold start particularly effective ignition and combustion of the fuel/air mixture takes place as a result of the relatively large distance of the ignition spark from the edge 218 of the combustion chamber 212. After the internal combustion engine 410 has been switched off, the expansion element 448 cools down and the spark plug 214 is pushed back into the combustion chamber 212 to the first position 400 of FIG. 4 by the spring element 446.

FIG. 6 is a flow chart illustrating a method 600 for operating an engine including an adjustment device coupled to a spark plug protruding into a combustion chamber of the engine. Method 600 may be carried out in order to operate the engine 10 including the spark plug 92 of FIG. 1, the engine 210 of FIGS. 2-3 and/or the engine 410 of FIGS. 4-5. Instructions for carrying out method 600 and the rest of the methods included herein may be executed by a controller (e.g., controller 12) based on instructions stored on a memory of the controller and in conjunction with signals received from sensors of the engine system, such as the sensors described above with reference to FIG. 1. The controller may employ engine actuators of the engine system, such as the ignition system 90 coupled to the spark plug 92 of FIG. 1, to adjust engine operation, according to the methods described below.

At 602, method 600 includes determining engine-operating parameters. The determined operating parameters may include, but are not limited to, engine speed, requested torque, engine temperature, boost pressure, engine output, exhaust gas constituent concentration, and other parameters.

The method 600 proceeds to 604 to determine the position of the spark plug. In one example, the position if the spark plug and hence, the position of the ignition spark location between the electrodes on the first end of the spark plug may be determined based on an engine operating temperature. In an example, when the engine is operating at a temperature below a threshold temperature, such as during engine cold start conditions, the ignition spark location may be farther from an edge of the combustion chamber (protrude more inside the combustion chamber) than when the engine is warmed up and is operating at a temperature above the threshold.

The method 600 proceeds to 606 to determine if the spark plug is at a first position. At a first position of the spark plug, the ignition spark location is protruding into the combustion chamber, away from the edge of the combustion chamber. In one example, the spark plug may in the first position during cold start conditions. During cold start, the expansion element of the adjustment device expands pushes the first end of the spark plug further into the combustion chamber, thus, positioning the ignition park location farther from the edge of the combustion chamber, as described above with reference to FIGS. 2 and 4. In one example, the expansion element may include temperature sensitive material, for example, Wood's metal with density anomaly, as described above with reference to FIGS. 2-3. In another example, the expansion element may be spring element, which may be coupled to a temperature sensitive material such as wax, or a bimetal element etc., as described above with reference to FIG. 4-5. If the spark plug is in the first position, the method 600 proceeds to 610.

At 610, the method 600 adjusts signal to the spark plug while the ignition spark location is at a first distance from the edge of the combustion chamber and is projecting inside the combustion chamber. The adjusting signal may include adjusting a voltage relayed to the spark plug, retarding or advancing ignition timing etc. to maintain engine operation for sustaining current engine speed and load. In one example, adjusting signal may include retarding the ignition timing when the spark plug is in the first position and the engine operating temperature is below the threshold temperature, for example, during engine cold start. Retarding ignition timing increases the engine operating temperature rapidly, thereby increasing combustion efficiency and reducing degradation of emissions during engine cold start.

If the spark plug is not at first position at 608, the method 600 proceeds to 612, where the spark plug is at the second position. In one example, the spark plug may be in the second position when the engine has warmed up and is operating at a temperature above the threshold temperature. In one example, as the temperature of the engine increases, the expansion element of the adjustment device retracts to move the spark plug away from the combustion chamber along the longitudinal axis of the spark plug, as discussed above with reference to FIGS. 3 and 5. Hence, in the second position the location of the ignition spark is closer to the edge of the combustion chamber and protrudes less inside the combustion chamber compared to the first position of the spark plug. The location of the ignition spark closer to the edge of the combustion chamber ensures effective ignition of fuel/air mixture along with sufficient cooling of the spark plug when the temperature of the engine is above the threshold temperature.

The method 600 proceeds to 614 and adjusts signal to the spark plug while the ignition spark location is at a second distance from the edge of the combustion chamber, the second distance being less than the first distance of 610. In one example, the ignition spark location may be at the second distance from the edge when the engine is warmed up (that is, engine temperature is above the threshold temperature). The adjusting signal may include adjusting a voltage relayed to the spark plug, ignition timing (retarding or advancing ignition timing) etc. to maintain engine operation for sustaining engine speed and load etc., while the engine is operating at the standard operating temperature. The method 600 then returns.

Thus, the internal combustion engine is operated based on the location of the ignition spark in the combustion chamber. The location of the ignition spark is shifted by means of the adjustment device from a position located more within the combustion chamber to a position located closer to the edge of the combustion chamber, depending on the temperature of the engine. In this way, during a warming-up phase of the internal combustion engine, the ignition spark location farther from the edge results in significantly more effective ignition and combustion of the fuel/air mixture in the combustion chamber. When a predefined engine operating temperature is reached, the location of the ignition spark is set to be closer to the edge of the combustion chamber.

The technical effect of regulating the location of the ignition spark inside the combustion chamber based on the operating temperature of the engine includes reduction of emission degradation by effective ignition of fuel/air mixture, along with increase in the life of the spark plug by positioning the spark plug closer to the edge of the combustion chamber during high temperature.

An example system comprises a combustion chamber of an internal combustion engine with a spark plug having electrodes to generate an ignition spark at a location within the combustion chamber, and an adjustment device including an expansion element coupled the spark plug that displaces the spark plug along a longitudinal axis of the spark plug to control a distance between the location of the ignition spark and an edge of the combustion chamber. In the preceding example, additionally or optionally, the ignition spark ignites an mixture of air and fuel in the combustion chamber. In any or all of the preceding examples, additionally or optionally, the distance between the edge of the combustion chamber and the location of the spark is decreased when the engine is above a threshold temperature and increased when the engine is below the threshold temperature. In any or all of the preceding examples, additionally or optionally, the expansion element includes a material with a density anomaly. In any or all of the preceding examples, additionally or optionally, the adjustment device includes a running sleeve displaceably arranged in a housing of the internal combustion engine, the running sleeve accommodating the spark plug. In any or all of the preceding examples, additionally or optionally, the expansion element is arranged between the running sleeve and the housing of the internal combustion engine. In any or all of the preceding examples, additionally or optionally, a spring element is provided for prestressing the adjustment device into a predefined position of the location of the ignition spark relative to the edge of the combustion chamber.

An example method for operating an internal combustion engine, comprising generating an ignition spark at an ignition spark location inside a combustion chamber of an internal combustion engine, the ignition spark generated between electrodes of a spark plug coupled to the combustion chamber, the ignition spark igniting a fuel mixture inside the combustion chamber, displacing the spark plug along a longitudinal axis of the spark plug by an expansion element coupled the spark plug, and reducing a distance between the ignition spark location and an edge of the combustion chamber responsive to an increase in temperature of the internal combustion engine above a threshold temperature. In the preceding example, additionally or optionally, the method further comprises increasing the distance between the ignition spark location and the edge of the combustion chamber responsive to a decrease in temperature of the internal combustion engine below the threshold temperature. In any or all of the preceding examples, additionally or optionally, reducing the distance includes contraction of the expansion element of an adjustment sleeve coupled to the spark plug, the contraction displacing the spark plug to reduce the distance. In any or all of the preceding examples, additionally or optionally, the method increasing the distance includes expansion of the expansion element, the expansion displacing the spark plug to increase the distance. In any or all of the preceding examples, additionally or optionally, the expansion element includes a thermally sensitive material. In the preceding example, additionally or optionally, the expansion element includes a spring element coupled to the thermally sensitive material. In any or all of the preceding examples, additionally or optionally, the method further comprising adjusting signal relayed to the spark plug based on the distance between the ignition spark location and the edge of the combustion chamber.

Another example method comprises determining position of a spark plug relative to an edge of a combustion chamber of an internal combustion engine, and adjusting a signal to the spark plug to regulate ignition of a fuel mixture inside the combustion chamber. In the preceding example, additionally or optionally, at an engine operating temperature below a threshold, the spark plug is moved to a first position where an ignition spark is located at a first distance from the edge of the combustion chamber. In the preceding example, additionally or optionally, at the engine operating temperature above the threshold, the spark plug is moved to a second position where the ignition spark is located at a second distance from the edge of the combustion chamber, the second distance being less than the first distance. In any or all of the preceding examples, additionally or optionally, adjusting the signal includes adjusting an ignition timing of the spark plug. In any or all of the preceding examples, additionally or optionally, adjusting the signal includes adjusting a voltage relayed to the spark plug. In any or all of the preceding examples, additionally or optionally, the spark plug is moved along a longitudinal axis of the spark plug by an expansion element coupled the spark plug.

The invention claimed is:
1. A system, comprising:
   a combustion chamber of an internal combustion engine with a spark plug having electrodes to generate an ignition spark at a location within the combustion chamber; and
   an adjustment device including an expansion element coupled to the spark plug that displaces the spark plug along a longitudinal axis of the spark plug to control a distance between the location of the ignition spark and an edge of the combustion chamber, wherein the adjustment device includes a running sleeve displaceably arranged in a housing of the internal combustion engine, the running sleeve accommodating the spark plug, and wherein the expansion element is arranged between the running sleeve and the housing of the internal combustion engine.

2. The system of claim 1, wherein the ignition spark ignites a mixture of air and fuel in the combustion chamber.

3. The system of claim 1, wherein the distance between the edge of the combustion chamber and the location of the ignition spark is decreased when a temperature of the internal combustion engine is above a threshold temperature and increased when the temperature of the internal combustion engine is below the threshold temperature.

4. The system of claim 3, wherein the expansion element includes a material with a density anomaly.

5. The system of claim 1, wherein a spring element is provided for prestressing the adjustment device into a predefined position of the location of the ignition spark relative to the edge of the combustion chamber.

6. A method, comprising:
generating an ignition spark at an ignition spark location inside a combustion chamber of an internal combustion engine, the ignition spark generated between electrodes of a spark plug coupled to the combustion chamber, the ignition spark igniting a fuel mixture inside the combustion chamber;
displacing the spark plug along a longitudinal axis of the spark plug by an expansion element coupled to the spark plug; and
reducing a distance between the ignition spark location and an edge of the combustion chamber responsive to an increase in temperature of the internal combustion engine above a threshold temperature.

7. The method of claim 6, further comprising increasing the distance between the ignition spark location and the edge of the combustion chamber responsive to a decrease in temperature of the internal combustion engine below the threshold temperature.

8. The method of claim 7, wherein increasing the distance includes expansion of the expansion element, the expansion displacing the spark plug to increase the distance.

9. The method of claim 6, wherein reducing the distance includes contraction of the expansion element of an adjustment sleeve coupled to the spark plug, the contraction displacing the spark plug to reduce the distance.

10. The method of claim 9, wherein the expansion element includes a thermally sensitive material.

11. The method of claim 10, wherein the expansion element includes a spring element coupled to the thermally sensitive material.

12. The method of claim 6, further comprising adjusting a signal relayed to the spark plug to provide the ignition spark based on the ignition spark location in the combustion chamber.

13. A method, comprising:
determining a position of a spark plug relative to an edge of a combustion chamber of an internal combustion engine via a controller and a sensor; and
adjusting a signal to the spark plug to regulate ignition of a fuel mixture inside the combustion chamber via the controller.

14. The method of claim 13, further comprising:
at an engine operating temperature below a threshold, moving the spark plug to a first position where an ignition spark is located at a first distance from the edge of the combustion chamber.

15. The method of claim 14, further comprising:
at an engine operating temperature above the threshold, moving the spark plug to a second position where the ignition spark is located at a second distance from the edge of the combustion chamber, the second distance being less than the first distance.

16. The method of claim 14, further comprising moving the spark plug along a longitudinal axis of the spark plug by an expansion element coupled to the spark plug.

17. The method of claim 13, wherein adjusting the signal includes adjusting an ignition timing of the spark plug.

18. The method of claim 13, wherein adjusting the signal includes adjusting a voltage relayed to the spark plug.

* * * * *